June 21, 1949.　　　　J. J. ROHRBACH　　　　2,474,119
PLASTIC BRACE BAR SPECTACLE WITH
PIVOTING LENS CONNECTIONS Filed Oct. 26, 1945　　　　　　　　　　　2 Sheets-Sheet 1

INVENTOR.
John J. Rohrbach
BY Theodore E. Simonton
ATTORNEY

June 21, 1949.  J. J. ROHRBACH  2,474,119
PLASTIC BRACE BAR SPECTACLE WITH
PIVOTING LENS CONNECTIONS
Filed Oct. 26, 1945
2 Sheets-Sheet 2
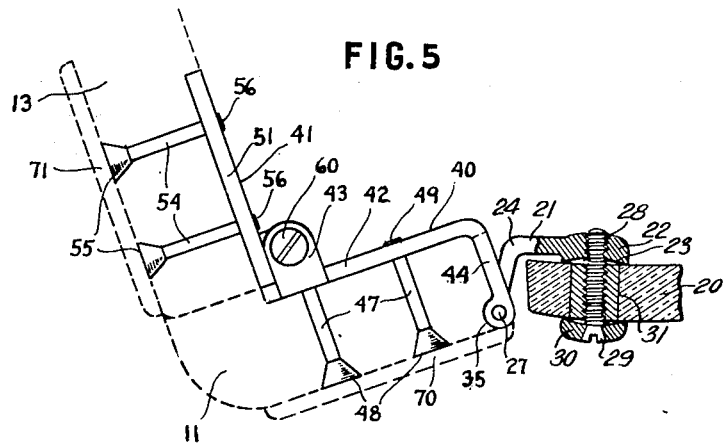
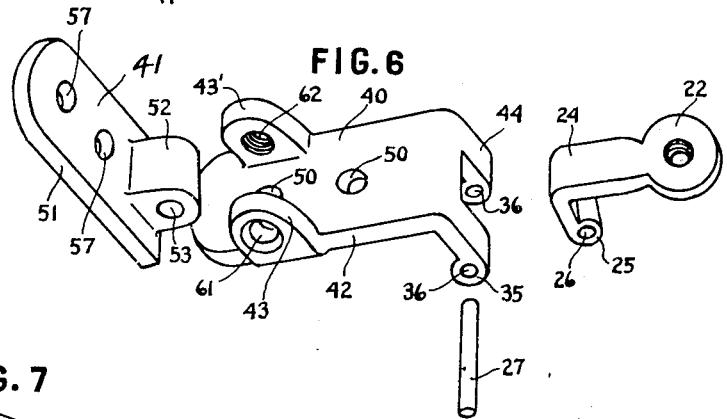
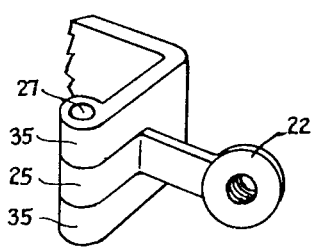
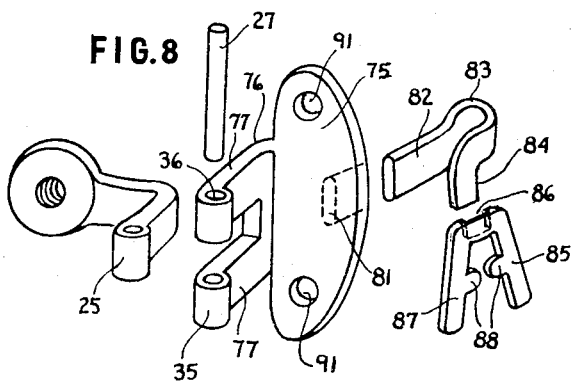
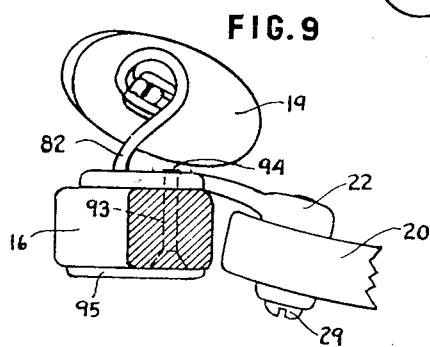
INVENTOR.
John J. Rohrbach
BY Theodore E. Simonton
ATTORNEY Patented June 21, 1949

2,474,119

UNITED STATES PATENT OFFICE 2,474,119

PLASTIC BRACE BAR SPECTACLE WITH PIVOTING LENS CONNECTIONS

John J. Rohrbach, Rochester, N. Y., assignor to Shuron Optical Company, Inc., Geneva, N. Y., a corporation of New York Application October 26, 1945, Serial No. 624,667

7 Claims. (Cl. 88—41)

This invention relates to improvements in ophthalmic mountings, and is directed more specifically to top arm spectacles made of zylonite or the like.

This invention constitutes an improvement upon the disclosure of Rochte United States Patent 2,301,328, issued November 10, 1942, in that it adapts the pivoted strap lens supporting arrangement of the Rochte patent to zylonite top arm or semi-rimless spectacles.

The principal object of my invention is to provide top arm spectacles made of zylonite or the like and having pivoted strap lens supports incorporated therein in a workmanlike and effective manner, which admits of precision mass production methods of manufacture resulting in a product of superior quality and appearance.

Other objects and advantages of my invention will become apparent upon reading the following specification in conjunction with the accompanying drawings, in which.

Figure 1:
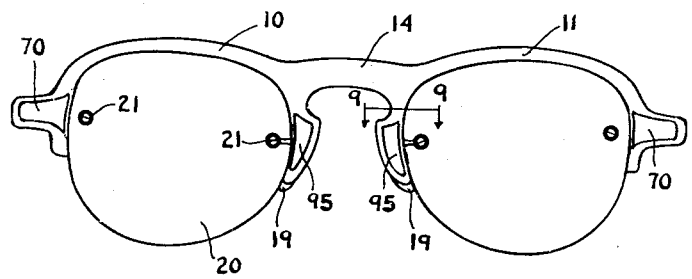
Figure 1 is a front view of a pair of spectacles embodying my invention.
Figure 2:
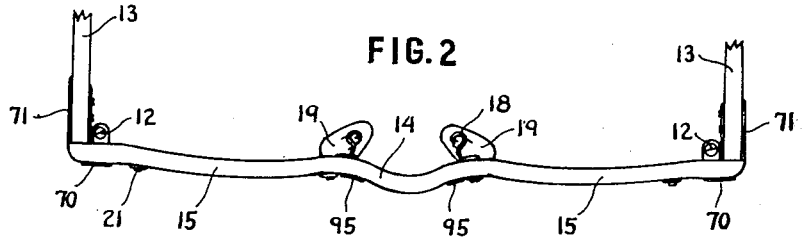
Figure 2 is a top plan view thereof, parts of the temples being broken away.
Figure 3:
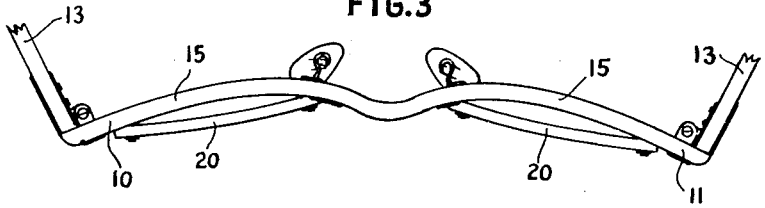
Figure 3 is a top plan view similar to Figure 2, but showing the spectacles in a distorted position, such as may be produced in putting them on or removing them from the face.
Figure 10:
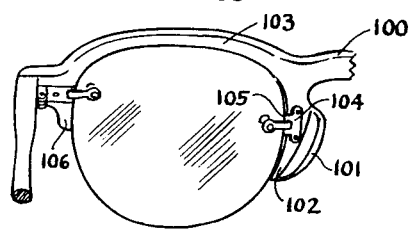

Figure 5 is an enlarged detail top plan view of a temporal pivoted strap and temple hinge assembly and associated parts, in the position occupied by the parts at the left hand side of Figure 3, the zylonite parts being shown in outline by broken lines and as though they were completely transparent, in order to avoid obscuring the other parts, and the strap ear and associated parts being shown in section;

Figure 6 is a detail exploded perspective view of certain of the metal parts of the temporal assembly shown in Figure 5;

Figure 7 is a detail perspective view of a pivoted strap and a portion of its supporting member shown in the normal position of Figures 1 and 2;

Figure 8 is a detail exploded perspective view of certain of the metal parts comprising a nasal pivoted strap and pad arm assembly;

Figure 9 is a detail section taken on the line 9—9 of Figure 1 and showing the nasal assembly of Figure 8 in the position of Figure 1; and Figure 10 is a rear perspective view of half of a pair of spectacles, showing a modification of my invention.

The spectacles 10 shown in Figures 1 to 3 of the drawings comprise a spectacle front 11 made of zylonite or like plastic material, hereinafter sometimes called zyl, hingedly connected by temporal assemblies 12 to temples 13 also made of zyl. The spectacle front 11 comprises a central bridge portion 14, top arm portions 15, nose pad supporting portions 16 depending from the bridge portion 14, and endpiece supporting portions 17, all preferably formed integrally from the plastic material. A nasal assembly 18 is secured to each of the nose pad supporting portions 16, and includes an adjustable nose pad 19 and associated parts which are illustrated as being of the general type disclosed in Krapp United States Patent 2,257,966, issued October 7, 1941, but may be of any other suitable construction.

The lenses 20 of the spectacles 10 are shown as located substantially beneath the top arms 15. Each lens 20 is suspended from the spectacle front 11 at two spaced points by a pair of pivoting lens straps 21, one of each pair of these straps 21 being pivoted to a portion of a temporal assembly 12 and the other to a portion of a nasal assembly 18.

As best shown in Figures 5 and 6, each strap 21 comprises a metal ear or lens supporting lug 22, the lens engaging surface of which is preferably concave as shown at 23, and which is carried by an integral offset arm 24, terminating in a knuckle 25 having an aperture 26 for engaging a pintle 27. The ear 22 is provided with a threaded aperture 28. The lenses 20 are secured to the ears 22 by the lens screws 29 passing through the conventional screw holes in the lenses and threaded into the apertures 28 in the ears. Each lens screw may be provided with a concave washer 30 and bushing 31, as shown in Figure 5. The ear 22, lens screw 29, washer 30 and bushing 31 are preferably constructed substantially as disclosed in McDonnell United States Patent 2,332,-160, issued October 19, 1943. It will be understood, however, that any other suitable means of securing the lenses 20 to the straps 21 could be employed. It will likewise be understood that the mounting as sold by the manufacturer does not usually include any lenses, but does include all of the other parts above described, and that the lenses are affixed by the optician.

As best shown in Figures 6, 7 and 8, the pintle 27, on which the knuckle 25 of the strap 21 is pivotally supported, is mounted in a forwardly projecting yoke comprising a pair of spaced arms terminating in knuckles 35 having apertures 36 for the reception of the pintle 27. After assembly of the pivotal mounting or hinge formed by the knuckles 25 and 35 and pintle 27, as shown in Figure 7, the ends of the pintle 27 may be slightly headed over or peened to hold the pintle in place. The spaced knuckles 35 may be parts of either a temporal assembly 12, as shown in Figure 6, or of a nasal assembly 18, as shown in Figure 8, as will be described hereinafter.

By virtue of the pivoted connection between the straps 21 and the pintles 27, the lenses are suspended from the spectacle front 11 in a freely floating manner. Any strain or distortion in the mounting, therefore, is not transmitted to the lenses. This is clearly shown in Figure 3, in which the spectacles 10 are shown in a severely distorted position which they would assume when the temples are spread outward a considerable distance. It will be observed in Figure 3 that the lenses 20 simply ride forward of the spectacle front and that, therefore, the lenses are free from the strain induced in the spectacle front by the distortion.

Figure 4:
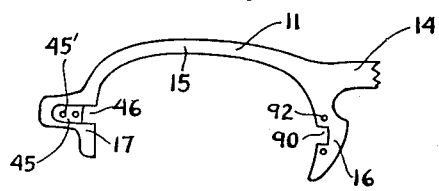
Figure 4 is a rear elevation of half of a spectacle front made of zylonite or the like, in condition for reception of the metal parts which go to make up the complete mounting.

The temporal assemblies 12 are best shown in Figures 5 and 6. Each assembly 12 comprises an endpiece 40 adapted to be secured to an endpiece supporting portion 17 of the spectacle front 11, and a temple member 41 adapted to be secured to the end of a temple 13. The endpiece 40 comprises a base plate 42 carrying near one end integral spaced rearwardly projecting temple hinge knuckles 43 and 43', and carrying at its other end an integral forwardly projecting yoke 44 having spaced arms terminating in the integral strap hinge knuckles 35. The endpiece supporting portion 17 of the spectacle front 11 is provided, as best shown in Figure 4, with a recess 45 of such size and shape as just to accommodate the base 42 of the endpiece 40, and is also provided with a notch 46 in which is seated the forwardly extending yoke 44. The base 42 is secured in the recess 45 by rivets 47, positioned in countersunk holes 45' suitably located in the recess 45. The heads 48 of the rivets 47 are substantially flush with the front face of the spectacle front 11. The ends 49 of the rivets 47 extend through apertures 50 in the base 42, and are peened over slightly as shown to secure the base 42 to the spectacle front.

The temple member 41 has a base plate 51 carrying at its forward end a knuckle 52 adapted to fit in the space between and cooperative with the spaced knuckles 43 and 43'. The knuckle 52 is provided with an aperture 53. The base 51 is received in a snugly fitting recess in the temple 13, in such manner that the exposed face of the base 51 is substantially flush with the inside of the temple. The base 51 is secured in this position by rivets 54 positioned in suitable countersunk holes drilled in the end of the temple 13. The heads 55 of the rivets 54 are substantially flush with the outside surface of the temple 13. The inner ends 56 of the rivets 54 extend through apertures 57 in the base 51, and are peened over slightly as shown to secure the base 51 to the temple.

The temple hinge may be completed in the conventional manner by a temple pintle screw 60 which passes loosely through an aperture 61 in the knuckle 43 and the aperture 53 and is threaded into an aperture 62 in the knuckle 43'. When thus assembled, the end of the base 51 abuts against the base 42 to limit the outward movement of the temples about the pintles 60, as best shown in Figure 5.

It will be evident to those skilled in this art that the bases 42 are riveted to the spectacle front 11 and the bases 51 are riveted to the temples 13 prior to the final assembly of the temples to the completed spectacle front by the temple pintle screws 60. It will likewise be evident that the temples 13 may be provided with conventional wire or like reinforcements and that, in such case, the rivets 54 may pass through the preferably flattened inner end of the reinforcing member.

In the construction thus far described, the rivet heads 48 would be exposed at the front of the spectacle front, and the rivet heads 55 would be exposed at the outside of the forward ends of the temples. Although it is very common to have such securing members visible at the outside of zyl mountings, there can be no question but that their presence detracts from the appearance of the mounting. In order to avoid this difficulty and improve the aesthetic appearance of my mounting, I have provided ornamental placques 70 and 71, as shown in Figures 1, 2 and 5, to conceal these rivet heads. The placques 70 also serve to cover and conceal the notches 46 and the yoke 44 and knuckles 35 seated therein. These placques may be decoratively shaped as shown, and may be made of a thin piece of zyl or like plastic to match or contrast pleasingly with the color of the plastic material of the spectacle front and the temples. The plastic placque 70 is cemented to the front of the spectacle front 11 in position to cover the rivet heads 48 and the notch 46, after the base 42 has been secured in place on the spectacle front, and the plastic placque 71 is similarly cemented to the outside of the temple 13 over the rivet heads 55, after the base 51 has been secured to the temple. The placques may be secured by any conventional plastic cement, or by the use of a solvent for zylonite, such as acetone, used to moisten the surfaces to be joined, and thus soften them sufficiently to permit the union of the placque to the main body of the plastic material by pressure. It will be understood that these plastic placques are preferably sufficiently opaque to conceal or substantially conceal the underlying metal parts. In lieu of these plastic placques, I may employ ornamental metal placques. In such case, the metal placques are preferably welded or soldered to the rivet heads before inserting the rivets in the holes drilled to receive them. Such metal placques are preferably provided with a few lines of graceful engraving on their outer surfaces to break up reflected light and prevent glare.

The nasal assemblies 18 are best shown in Figures 8 and 9. Each assembly 18 comprises a base plate 75, having at one side thereof and projecting forwardly therefrom an integral yoke 76 having spaced arms 77 terminating in the integral strap hinge knuckles 35. Near the other side of the base 75 is an aperture 81 in which is mounted a pad arm 82, which may be secured in the aperture 81 by soldering or otherwise as desired. The pad arm 82 is formed with a substantially horizontal pliable adjusting loop 83 and its free end terminates in a substantially vertically depending lug 84. The lug 84 is adapted to be welded in a recess 86 formed in the top cross bar of the yoke 85. The side arms 87 of the yoke 85 are provided with integral transverse pintle elements 88, which are adapted to be inserted in a loop or knuckle on the back of the nose pad 19, after which the side arms 87 are squeezed together to complete the pintle and hold the nose pad pivotally in place.

The base 75 is mounted on the inside of the nose pad supporting portion 16 of the spectacle front 11, which portion is provided with a notch 90, shown in Figure 4, in which the forwardly extending yoke 76 seats. The base 75 is provided with apertures 91 and the portions 16 of the spectacle front are provided with countersunk holes 92, through which pass rivets 93 the heads of which are located at the front side of the spectacle front 11. The ends 94 of the rivets 93 may be peened over as shown in Figure 9 to hold the base 75 in place. The heads of the rivets 93 are concealed by an ornamental placque 95, shown in Figures 1 and 9, which serves to conceal the heads of these rivets and the notch 90, thus performing the same functions as the placques 70. The ornamental placque 95 may be made of plastic material and cemented to the front of the spectacle front after the base 75 has been riveted thereto, or may be of metal welded to the heads of the rivets 93, precisely as described for the placques 70 and 71.

It will be observed that the straps 21 are pivotally mounted on the pintles 27, the central portion of each pintle constituting a substantially vertical journal for its strap 21, and that the straps 21 are restrained from vertical movement by the spaced knuckles 35. An accurate pivotal mounting of the straps 21 on the zyl spectacle front 11 is thus obtained. By making the yoke supports for the pintles 27 integral parts of the endpieces 40 and the nasal base plates 75, respectively, and by locating these forwardly extending yokes 44 and 76 in the notches 46 and 90, respectively, an extremely compact, rugged and good-looking construction is obtained. The use of the ornamental placques 70, 71 and 95 conceals almost all of the metal structural parts from view when the spectacles are worn in the usual manner, and greatly enhances the artistic appearance of the mounting.

The spectacles 100 of Figure 10 differ from the spectacles 10 hereinabove described in that they are provided with conventional fixed nose pads 101 in lieu of the equally conventional adjustable nose pads 19 of the spectacles 10. Each nose pad 101 is preferably formed of plastic material integrally with the plastic nose-pad supporting portion 102 of the spectacle front 103, in accordance with usual practice. The base plate 104 of the nasal strap assembly 105 may be made somewhat smaller than the base plate 75 of the assembly 18, as illustrated, since no room need be provided for the attachment of a metal pad arm to the base plate 104. The spectacles 100 may otherwise be identical to the spectacles 10.

It will be observed that both the spectacles 10 and the spectacles 100 are semi-rimless spectacles. It is perfectly feasible to make them as full-rimmed spectacles, merely by adding integral plastic bottom arms extending between the portions 16 and 17 or the corresponding portions 102 and 106, around the bottom edges of the lenses. The addition of such bottom arms does not in any way disturb the functioning of the pivoted straps, as illustrated in Figure 3. On the other hand, the bottom arms are quite unnecessary, and I prefer to omit them. The use of the term "top arms" in the appended claims is, however, not to be interpreted as excluding the presence of such bottom arms, except where used in conjunction with the term "semi-rimless."

Although I have thus described my invention in considerable detail in the best forms of which I am aware, in accordance with the patent statutes, it will be evident that various changes and modifications may be made by those skilled in the art without departing from the spirit of my invention. For example, the spectacle front need not be made wholly of plastic material, but may be reinforced with metal, as already known in this art. Accordingly, I desire to be limited only by the scope of the appended claims.

I claim:

1. An ophthalmic mounting comprising a spectacle front having a bridge and top arms made at least in part of plastic material, two metal plates secured to said spectacle front at opposite sides of said bridge, two metal endpieces secured to said spectacle front adjacent the ends of said top arms, temples hinged to said endpieces, said plates and said endpieces each carrying pintle supports, four separate pintles mounted one in each of said pintle supports, said pintles being located at spaced points adjacent the opposite sides of a pair of lenses and beneath said top arms, each of said pintles having a substantially vertical journal portion, and a lens strap pivotally mounted on each of said journal portions, said pintle supports being provided with means for limiting vertical movement of said lens straps on said journal portions, and each of said lens straps having a lens-engaging portion located behind the associated pintle and adapted to contact the rear of the lens.

2. An ophthalmic mounting as claimed in claim 1, in which said plates and said endpieces are secured to the rear side of said spectacle front by fastening members extending through said spectacle front to the front side thereof, and in which said fastening members are concealed from front view by ornamental placques located over said fastening members.

3. An ophthalmic mounting comprising a spectacle front having a bridge and top arms made at least in part of plastic material, two metal plates secured to the rear side of said spectacle front at opposite sides of said bridge, two metal endpieces secured to the rear side of said spectacle front adjacent the ends of said top arms, temples hinged to said endpieces, said plates and said endpieces each having a forwardly projecting yoke carrying spaced knuckles, each of said yokes being located in a notch formed in the adjacent portion of the spectacle front, said notches being located at spaced points adjacent the opposite sides of a pair of lenses, four separate pintles mounted one in the spaced knuckles of each of said yokes, each of said pintles having a substantially vertical journal portion, and a lens strap pivotally mounted on each of said journal portions by means of a knuckle fitting snugly between said spaced knuckles for limiting vertical movement of said lens strap on said journal portion.

4. An ophthalmic mounting comprising a spectacle front having a bridge, top arms, nose pad supporting portions and endpiece supporting portions made at least in part of plastic material, a metal pad arm assembly secured to the rear side of each of said nose pad supporting portions, a nose pad mounted on each of said pad arm assemblies, a metal endpiece secured to the rear side of each of said endpiece supporting portions, a forwardly projecting yoke extending from each of said assemblies and endpieces and carrying a pair of pintle supports, four separate pintles mounted one in each of said pairs of pintle supports, said pintles being located at spaced points adjacent the opposite sides of a pair of lenses, each of said pintles having a substantially vertical journal portion, and a lens strap pivotally mounted on each of said journal portions, said pintle supports being provided with means for limiting vertical movement of said lens straps on said journal portions.

5. An ophthalmic mounting as claimed in claim 4, in which each of said yokes is located in a notch formed in the adjacent supporting portion of the spectacle front.

6. A semi-rimless ophthalmic mounting comprising a spectacle front having a bridge, top arms, nose pad supporting portions and endpiece supporting portions made at least in part of plastic material, a metal pad arm assembly secured to the rear side of each of said nose pad supporting portions, a nose pad mounted on each of said pad arm assemblies, a metal endpiece secured to the rear side of each of said endpiece supporting portions, a forwardly projecting yoke extending from each of said assemblies and endpieces and carrying a pair of pintle supports, four separate pintles mounted one in each of said pairs of pintle supports, said pintles being located at spaced points adjacent the opposite sides of a pair of lenses, each of said pintles having a substantially vertical journal portion, a lens strap pivotally mounted on each of said journal portions by means of a knuckle fitting snugly between said spaced pintle supports for limiting vertical movement of said lens strap on said journal portion, said pad arm assemblies and said endpieces being secured to said supporting portions of the spectacle front by fastening members extending through said spectacle front to the front side thereof, and ornamental placques located over said fastening members on the front side of said supporting portions for concealing said fastening members from view.

7. A semi-rimless ophthalmic mounting as claimed in claim 6, in which each of said yokes is located in a notch formed in the adjacent supporting portion of the spectacle front, and in which said placques also cover and conceal said notches and said yokes.

JOHN J. ROHRBACH.

REFERENCES CITED

The following references are of record in the file of this patent:

UNITED STATES PATENTS

| Number | Name | Date |
|---|---|---|
| 2,301,328 | Rochte | Nov. 10, 1942 |
| 2,392,418 | Splaine | Jan. 8, 1946 |

FOREIGN PATENTS

| Number | Country | Date |
|---|---|---|
| 384,198 | Great Britain | Dec. 1, 1932 |